July 28, 1953 A. A. WEISBERGER 2,646,861
WELDED BRAKE BEAM
Filed Dec. 29, 1949
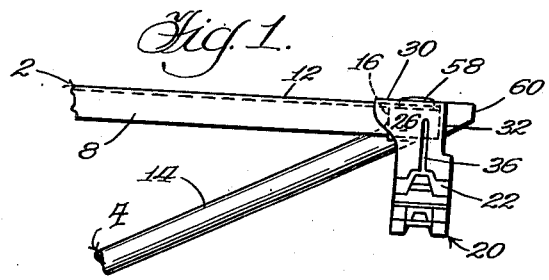
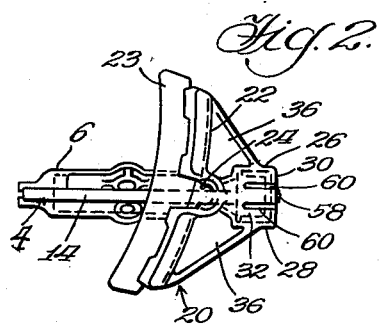
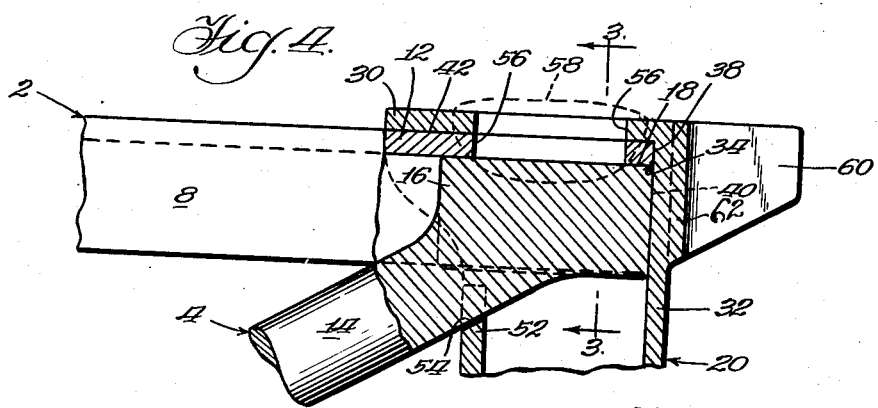
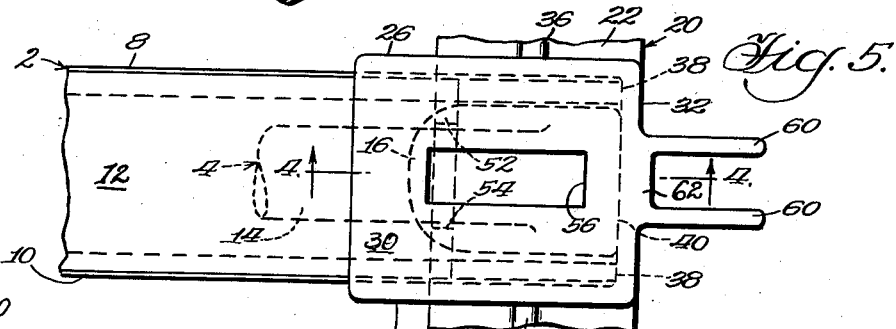
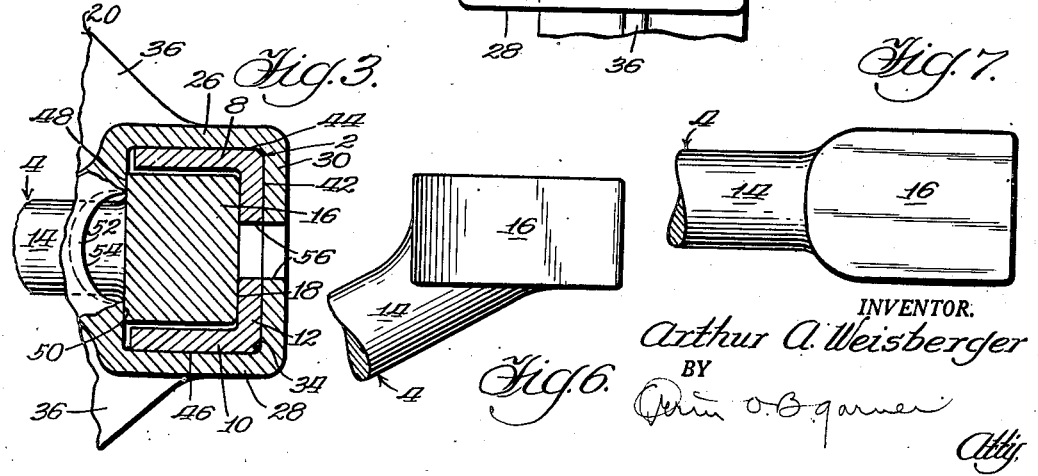
INVENTOR.
Arthur A. Weisberger
BY
Atty.

Patented July 28, 1953

2,646,861

UNITED STATES PATENT OFFICE 2,646,861

WELDED BRAKE BEAM

Arthur A. Weisberger, Chicago, Ill., assignor to American Steel Foundries, Chicago, Ill., a corporation of New Jersey Application December 29, 1949, Serial No. 135,756

10 Claims. (Cl. 188—223.1)

This invention relates to brake beams and more particularly to fabricated truss type railway brake beams.

The general object of the invention is to provide a fabricated beam of simple form which may be easily and economically manufactured.

A further object is to provide a brake beam comprising tension and compression members and brake heads at opposite ends of the beam wherein each brake head and said members are welded to each other in a novel manner to obtain an exceptionally rigid structure.

A more specific object is to devise a beam wherein the parts are arranged to interfit in a novel manner to provide an adequate foundation for a weld interconnecting the parts and wherein the weld leakage area between the parts is reduced to the minimum, thus eliminating the necessity of separate sealers.

The invention contemplates the provision of a brake beam comprising a tension member with end portions formed wider than the remainder of the tension member transversely of the plane thereof to increase the bearing area between the tension and compression members.

The invention comprehends a brake beam wherein each end portion of the tension member is received within a channel of a compression member and wherein the compression member and end portion are embraced by a sleeve of a brake head, the sleeve and a wall of the compression member being provided with registering openings forming a welding gap open at one end through the rear side of the beam and closed at the other end by the adjacent end portion which extends a substantial distance beyond the opposite sides and ends of the gap, whereby weld metal deposited into the gap is effectively prevented from escaping between the end portion and the wall of the compression member when the compression member wall and the end portion melt during welding.

A further object is to form the end portions of substantially uniform cross section throughout their lengths, thus permitting welding within the gap at a substantially constant rate from one end of the gap to the other without danger of burning through the end portion and losing the weld.

A different object of the invention is to arrange the parts in such manner that a uniform arc distance is afforded for the full travel of the welding electrode.

Another object is to provide an end construction on the tension member which readily permits of brake beam designs wherein the truss force lines can be made to intersect at the proper points.

A still further object is to provide an end construction on the tension member which will be self-centering in the channel of the compression member.

These and other objects of the invention will become more apparent from the specification and the drawing, wherein:

Figure 1 is a fragmentary top plan view of one end of a brake beam incorporating the invention;

Figure 2 is an end view thereof;

Figure 3 is a transverse vertical sectional view taken substantially on the line 3—3 of Figure 4;

Figure 4 is a horizontal sectional view taken substantially on the line 4—4 of Figure 5;

Figure 5 is a fragmentary rear view of the brake beam;

Figure 6 is a top plan view of an end portion of the tension member; and

Figure 7 is a rear view thereof.

Describing the invention in detail, the novel brake beam comprises a truss structure including tension and compression members generally indicated 2 and 4 adapted for connection in the usual manner at the transverse center line of the beam by a strut 6 affording connection to the associated actuating means, such as a brake lever (not shown). The compression member is of U or channel section and of substantially uniform cross section throughout its length and comprises top and bottom webs or flanges 8 and 10 interconnected by a rear wall 12. The tension member is preferably of round section although, it will be understood, it may be of any desired configuration, such as square or rectangular, and comprises an intermediate section or diagonal arms 14 and an end portion 16 at the end of each arm fitted into the channel of the compression member between the top and bottom webs thereof and in flat face engagement at the rear side with the front side of the rear wall of the compression member as at 18. The end portion is preferably formed by upsetting the end of the tension member and is of uniform cross section from end to end. Each end portion is formed wider than the diameter of section 14 of the tension member transversely of the plane of the tension member and extends the same distance above and below said section. It will be noted that the end portion is approximately as wide as the space between the top and bottom webs of the compression member, whereby it is self-centering within the channel and that it is longer than the diameter of said section. The forward side of the end portion 16 projects out of the channel forwardly of the top and bottom webs of the compression member.

A brake head generally designated 20 is mounted at each end of the truss structure and comprises a front wall 22 adapted to support associated brake shoe means 23 in conventional manner. The front wall is formed with a hanger socket 24 intermediate its ends by means of which the beam may be suspended from an associated truck structure (not shown) by a conventional hanger arrangement (not shown). The brake head comprises spaced top and bottom walls 26 and 28 connected at their forward ends to the rear of the front wall in the area of the socket and extending rearwardly thereof. The top and bottom walls 26 and 28 are interconnected at their rear ends by a generally vertical rear wall 30. The top and bottom walls 26 and 28 and the rear wall 30 are connected at their outboard edges to a generally vertical outboard wall or web 32 and define a sleeve forming a pocket generally designated 34. The top and bottom walls 26 and 28 are additionally connected to the front wall 20 of the brake head by top and bottom ribs 36, 36.

The brake head pocket 34 receives the compression member and end portion 16 of the tension member therein. The inner face of the outboard wall 32 of the brake head is seated in flat face engagement as at 38 against a complementary face on the outboard ends of the flanges and wall of the compression member. Wall 32 also seats as at 40 against a generally vertical flat face on the outboard end of the end portion of the tension member. The inner side of the rear wall 30 of the brake head has flat face engagement as at 42 with the outer or rear face of the rear wall of the compression member. The inner side of the top wall 26 of the sleeve has flat face engagement as at 44 with the top side of the top web of the compression member, and the inner side of the bottom wall of the sleeve has flat face engagement as at 46 with the bottom side of the bottom web of the compression member. The top and bottom walls 26 and 28 are offset toward each other forwardly of the end portion 16 of the tension member and are in flat face engagement as at 48 and 50 with the forward side of the end portion 16 for the full width of the brake head above and below the tension member section 14. The brake head is provided on its inboard side with an inboard wall 52 interconnecting the top and bottom walls 26 and 28 forwardly of the pocket 34, said wall 52 having an opening 54 through which the tension member extends.

The rear wall of the compression member and the rear wall of the brake head are provided with registering codimensional openings 56, 56 defining a welding cavity which is open through the rear side of the beam and at the forward side of the cavity is closed by the end portion 16 of the brake beam. It will be noted that the end portion 16 extends a substantial distance inboardly of the respective ends of the cavity and also extends a substantial distance above and below the weld cavity, as well seen in Figures 3 and 4. The brake head and the tension and compression members are interconnected and united into a unitary structure by depositing molten weld metal 58 within the weld cavity. It will be noted that the construction reduces leakage area to the minimum and does not require any sealers or special chill blocks, and the fact that the end portion extends a substantial distance beyond the periphery of the welding cavity prevents the weld from flowing out of the cavity as the parts are melted in the immediate proximity of the cavity during welding.

The beam is adapted to be associated with a conventional safety ledge, as will be understood by those skilled in the art, and is provided on the outboard side of the outboard wall 34 thereof with a plurality of vertically spaced, generally parallel support lugs 60, 60 which project outboardly of said outboard wall. These lugs are adapted to engage an associated safety support (not shown) in the event of failure of a brake hanger which normally supports the beam. It will be noted that if the bottom lug should break, the brake beam would still be supported by the top lug 60. Wall 32 has a thickened portion 62 disposed between lugs 60, 60 in alignment longitudinally of the beam with openings 56, 56 to strengthen the connection between the lugs and wall and to prevent the possibility of burning through wall 32 during welding.

It will be understood that the brake beam is a bilaterally symmetrical structure and that the arrangement shown at one end is duplicated at the other end.

I claim:

1. In a brake beam, a truss structure comprising a U-section compression member of uniform cross section from end to end and having a rear wall and top and bottom flanges projecting forwardly therefrom, a tension member having an end portion formed wider than the tension member transversely of the plane thereof and extending between said flanges and seated against said rear wall, said end portion extending longitudinally parallel to said rear wall and being of uniform rectangular or other suitable cross section from end to end and extending at its forward side forwardly of said flanges, a brake head having a sleeve forming a pocket receiving said compression member and end portion therein, said sleeve including a web closing the outboard extremity of said pocket and in flat face engagement with the end of the compression member and outboard extremity of said end portion, said sleeve comprising a rear wall engaging the rear wall of the compression member and having top and bottom walls seated against the top and bottom flanges, said top and bottom walls being offset toward each other forwardly of said end portion and in flat face engagement with the forward side thereof above and below said tension member, an inboard wall disposed forwardly of said end portion connected to said top and bottom walls and having an aperture therein accommodating said tension member therethrough and in complementary engagement therewith around the periphery of said aperture, said rear walls of the sleeve and compression member having registering openings therethrough defining a weld cavity extending lengthwise longitudinally of said compression member and terminating at its outboard end inboardly of the outboard extremities of the compression member and end portion and at its inboard end terminating outboardly of the inboard extremity of said end portion, said cavity terminating at opposite sides a substantial distance inwardly of the periphery of said end portion, said cavity being closed at its forward side by said end portion and at its rear side extending through the rear of the beam, a weld applied through the rear side of said cavity filling the same and connecting said rear walls to each other and to said end portion, and support means for said beam on said web extending outboardly thereof longitudinally of said compression member.

2. In a brake beam, a truss structure including tension and compression members, said compression member comprising a generally vertical rear wall and spaced top and bottom flanges extending forwardly therefrom, an end portion in the form of a rectangular block fitted within said compression member and seated at its rear side against the forward side of said rear wall and extending at its forward side forwardly of the forward edges of said flanges and having a flat face at its outboard end flush with the adjacent end of the compression member, said block being connected intermediate its top and bottom edges at its inboard end and forward side with said tension member, said tension member extending at an obtuse angle with respect to the inboard end and forward side of said block, a brake head comprising a sleeve snugly receiving an end of said truss structure therein, said sleeve having a wall at its outboard end in flat face engagement with the outboard extremities of said end portion and compression member, said rear wall and said sleeve having aligned openings spaced inboardly of the outboard extremities of said compression member and end portion and defining a weld cavity closed at its forward end by said end portion, a weld disposed within said cavity and fusing said sleeve, rear wall, and end portion, said end portion extending a substantial distance beyond the periphery of said cavity to prevent the escape of weld metal as said sleeve, rear wall and end portion are melted in the immediate proximity of the cavity during welding, said end portion being of substantially uniform cross section throughout its length and extending from said rear wall to the forward edges of said webs whereby the possibility of burning through said end portion by molten weld is prevented.

3. In a brake beam, a truss structure comprising tension and compression members, said compression member being of substantially uniform cross section throughout its length and having a rear wall and top and bottom flanges extending forwardly therefrom, said tension member having an end portion formed wider than said tension member transversely of the plane thereof and extending at opposite sides of said tension member, said end portion extending between said flanges and seated at its rear side in flat face engagement against the forward side of said rear wall, said end portion being of uniform rectangular cross section throughout its length and extending lengthwise longitudinally of said compression member, the outboard extremity of said end portion having a flat face extending transversely of said compression member coplanar with the outboard ends of said wall and flanges, said end portion having a flat face on its forward side projecting forwardly of the forward edges of said flanges, said rear wall having a slot in alignment with said end portion transversely of said compression member, the margins of said slot being disposed a substantial distance inwardly of the adjacent periphery of said end portion, and a weld filling said slot and fusing said wall and end portion into a unitary structure.

4. In a brake beam, a truss structure comprising tension and compression members, said compression member being of substantially uniform cross section from end to end and having a rear wall and spaced top and bottom flanges extending forwardly therefrom, a tension member having an integral end portion formed wider than the tension member transversely of the plane of the beam and extending above and below said tension member, said end portion being fitted within said compression member between the flanges thereof and seated in flat face engagement at its rear side against the forward side of said rear wall, a brake head having a sleeve fitted snugly around said compression member and in abutment with the forward side of said end portion forwardly of the forward edges of said flanges, said sleeve comprising a wall at the outboard side of the head in flat face abutment with the outboard extremities of said compression member and end portion, said sleeve and rear wall having aligned openings defining a weld cavity centered with respect to said end portion and of substantially smaller area than the rear side of said end portion, and a weld completely filling said cavity and connecting said end portion with said rear wall and sleeve.

5. A brake beam comprising a brake head having a sleeve, tension and compression members having end portions received within said sleeve, said end portion of the compression member including a rear wall and spaced top and bottom flanges extending forwardly therefrom, said end portion of the tension member being wider than said tension member in directions parallel and transversely with respect to the plane thereof and extending between said flanges and seated at its rear side against the forward side of said rear wall, said sleeve including a wall in flat face engagement with the outboard extremities of said compression member and end portion, said sleeve having sections engaging the forward side of said end portion forwardly of the forward ends of said flanges, said rear wall and sleeve having aligned openings defining a weld cavity centered with respect to the rear side of said end portion, and a weld deposited within said cavity fusing said sleeve with said rear wall and said rear wall with the rear side of said end portion.

6. In a brake beam, a truss structure including tension and compression members, said compression member having a rear wall and spaced top and bottom flanges extending forwardly therefrom, said tension member having an end portion extending between said flanges and seated against said rear wall, a brake head comprising a sleeve embracing said end portion and compression member, said sleeve comprising a rear web seated against said wall and an outboard web seated in flat face engagement with the outboard extremities of said end portion and compression member, registering welding slots in said rear wall and rear web centered with respect to the latter, and a weld within said slots interconnecting said rear wall and web and end portion, said outboard web being thickened in the zone of said slots to prevent the weld from burning therethrough.

7. In a brake beam, a truss structure comprising a compression member of channel cross section from end to end and having a rear wall and top and bottom flanges projecting forwardly therefrom, a tension member having an end portion formed wider than the tension member transversely of the plane thereof and extending between said flanges and seated against said rear wall, said end portion extending longitudinally parallel to said rear wall and being of greater length than width or thickness and extending at its forward side forwardly of said flanges, a brake head having a sleeve forming a pocket receiving said compression member and end portion therein, said sleeve including a web closing the outboard extremity of said pocket and in flat face engagement with the end of the compression member and outboard extremity of said end portion, said sleeve comprising a rear wall engaging the rear wall of the compression member and having top and bottom walls seated against the top and bottom flanges, said top and bottom walls being offset toward each other forwardly of said end portion and in engagement with the forward side thereof above and below said tension member, an inboard wall disposed forwardly of said end portion connected to said top and bottom walls and having an aperture therein accommodating said tension member therethrough and in complementary engagement therewith around the periphery of said aperture, said rear walls of the sleeve and compression member having registering openings therethrough defining a weld cavity extending lengthwise longitudinally of said compression member and terminating at its outboard end inboardly of the outboard extremities of the compression member and end portion and at its inboard end terminating outboardly of the inboard extremity of said end portion, said cavity terminating at opposite sides a substantial distance inwardly of the periphery of said end portion, said cavity being closed at its forward side by said end portion and at its rear side extending through the rear of the beam, and a weld applied through the rear side of said cavity filling the same and connecting said rear walls to each other and to said end portion.

8. In a brake beam, a truss structure including tension and compression members, said compression member comprising a generally vertical rear wall and spaced top and bottom flanges extending forwardly therefrom, an end portion in the form of a block of greater length than width or thickness fitted within said compression member and seated at its rear side against the forward side of said rear wall and extending at its forward side forwardly of the forward edges of said flanges and having a flat face at its outboard end flush with the adjacent end of the compression member, said end portion being connected intermediate its top and bottom edges at its inboard end and forward side with said tension member, said tension member extending at an obtuse angle with respect to the inboard end and forward side of said end portion, a brake head comprising a sleeve snugly receiving an end of said truss structure therein, said sleeve having a wall at its outboard end in flat face engagement with the outboard extremities of said end portion and compression member, said rear wall and said sleeve having aligned openings spaced inboardly of the outboard extremities of said compression member and end portion and defining a weld cavity closed at its forward end by said end portion, a weld disposed within said cavity and fusing said sleeve, rear wall, and end portion, said end portion extending a substantial distance beyond the periphery of said cavity to prevent the escape of weld metal as said sleeve, rear wall and end portion are melted in the immediate proximity of the cavity during welding.

9. In a brake beam, a truss structure comprising tension and compression members, said compression member being of substantially uniform cross section throughout its length and having a rear wall and top and bottom flanges extending forwardly therefrom, said tension member having an end portion formed wider than said tension member transversely of the plane thereof and extending at opposite sides of said tension member, said end portion extending between said flanges and seated at its rear side in flat face engagement against the forward side of said rear wall, said end portion being of greater length than width or thickness and extending lengthwise longitudinally of said compression member, the outboard extremity of said end portion having a flat face extending transversely of said compression member coplanar with the outboard ends of said wall and flanges, said end portion having a front face projecting forwardly of the forward edges of said flanges, said rear wall having a slot in alignment with said end portion transversely of said compression member, the margins of said slot being disposed a substantial distance inwardly of the adjacent periphery of said end portion, and a weld filling said slot and fusing said wall and end portion into a unitary structure.

10. In a brake beam, a truss structure including tension and compression members, said compression member having a rear wall and spaced top and bottom flanges extending forwardly therefrom, said tension member having an end portion extending between said flanges and seated against said rear wall, a brake head comprising a sleeve embracing said end portion and compression member, said sleeve comprising a rear web seated against said wall and an outboard web seated in flat face engagement with the outboard extremities of said end portion and compression member, registering welding slots in said rear wall and rear web centered with respect to the adjacent periphery of said end portion and of smaller area than the rear side of the latter, and a weld within said slots interconnecting said rear wall and web and end portion.

ARTHUR A. WEISBERGER.

References Cited in the file of this patent

UNITED STATES PATENTS

| Number | Name | Date |
|---|---|---|
| 2,254,514 | Busse | Sept. 2, 1941 |
| 2,398,917 | Busch | Apr. 23, 1946 |
| 2,478,991 | Walker | Aug. 16, 1949 |
| 2,493,913 | Busch | Jan. 10, 1950 |